United States Patent
Ehrmann et al.

(10) Patent No.: US 9,580,198 B2
(45) Date of Patent: Feb. 28, 2017

(54) LINE CONVERGER WITH LABEL DISPENSER

(71) Applicant: Multivac Sepp Haggenmüller GmbH & Co. KG, Wolfertschwenden (DE)

(72) Inventors: Elmar Ehrmann, Bad Grönenbach (DE); Guido Spix, Ulm (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 14/553,455

(22) Filed: Nov. 25, 2014

(65) Prior Publication Data

US 2015/0158617 A1    Jun. 11, 2015

(30) Foreign Application Priority Data

Dec. 5, 2013    (EP) ..................................... 13195889

(51) Int. Cl.
| | | |
|---|---|---|
| *B23B 41/00* | (2006.01) | |
| *B65C 1/00* | (2006.01) | |
| *B65C 1/02* | (2006.01) | |
| *B65C 9/18* | (2006.01) | |
| *B65G 47/68* | (2006.01) | |

(52) U.S. Cl.
CPC ................. *B65C 1/00* (2013.01); *B65C 1/02* (2013.01); *B65C 9/1869* (2013.01); *B65G 47/681* (2013.01)

(58) Field of Classification Search
CPC .. B65C 1/021; B65C 2009/401; B65G 47/682
USPC ..... 156/360, 361, 362, 363, 542; 198/367.1; 209/656
See application file for complete search history.

(56) References Cited

U.S. PATENT DOCUMENTS

| | | | |
|---|---|---|---|
| 4,669,604 A * | 6/1987 | Lenhart .............. | B65G 21/2036 198/433 |
| 5,133,827 A | 7/1992 | Ratermann | |
| 5,232,539 A * | 8/1993 | Carpenter et al. ............ | 156/360 |
| 5,750,004 A | 5/1998 | Wurz et al. | |
| 5,954,913 A | 9/1999 | Wurz et al. | |
| 6,543,505 B1 | 4/2003 | Harte | |
| 2010/0314024 A1 * | 12/2010 | Chitraker et al. ............... | 156/64 |
| 2012/0192526 A1 * | 8/2012 | Spix et al. ...................... | 53/396 |

FOREIGN PATENT DOCUMENTS

| | | |
|---|---|---|
| DE | 4135106 A1 | 4/1993 |
| DE | 102010017821 A1 | 10/2011 |
| DE | 102011112328 A1 | 3/2013 |
| EP | 0952085 A1 | 10/1999 |
| WO | 2007031866 A1 | 3/2007 |

OTHER PUBLICATIONS

PHD, "Conveyor Solutions", http://litstore.phdinc.com/pdf.asp?filename=CONVEYOR01.pdf, 2011.*

* cited by examiner

*Primary Examiner* — Michael N Orlando
*Assistant Examiner* — Joshel Rivera
(74) *Attorney, Agent, or Firm* — Husch Blackwell LLP

(57) ABSTRACT

The present invention relates to a line converger comprising a label dispenser and to a method for converging a row of at least three packages into a single lane and for applying a label to each package before the packages leave the line converger.

15 Claims, 2 Drawing Sheets

LINE CONVERGER WITH LABEL DISPENSER

CROSS-REFERENCE TO RELATED APPLICATIONS

This Application claims priority to European Patent Application Number 13195889.4 filed Dec. 5, 2013, to Elmar Ehrmann and Guido Spix entitled "Line Converger with Label Dispenser," currently pending, the entire disclosure of which is incorporated herein by reference.

FIELD OF THE INVENTION

The present invention relates to a line converger for packages as well as to a method for operating a line converger.

BACKGROUND OF THE INVENTION

DE 10 2010 017 821 A1 discloses a line converger for converging separate packages, which are conveyed in parallel on several lanes, into a single lane of successive packages.

DE 41 35 106 C2 discloses a labeler that applies labels to packages conveyed in succession on a conveyor belt located below the labeler.

In a packaging plant comprising a line converger for converging a multi-lane format of packages from a thermoform packaging machine into a single lane as well as a labeler for labeling the packages downstream of the line converger on a single-lane conveyor belt, the line converger and the conveyor system including the labeler are arranged in succession and have, in combination, a large footprint in the conveying direction.

SUMMARY OF THE INVENTION

It is the object of the present invention to reduce the total space required for a line converger and a conveyor system including a label dispenser.

The line converger according to one embodiment of the present invention comprises at least one conveyor belt and at least one adjustable guide rail with a guide. The line converger may also include a control unit and a label dispenser for applying labels to a package. A sensor may be provided and connected to the control unit to detect a leading edge of each package to be labeled. According to such an embodiment, a single-lane conveyor belt provided for the label dispenser is no longer necessary and, consequently, fewer drives are required for the conveyor belts and the space required corresponds to only the footprint of a line converger.

The label dispenser may be adjustable in a direction transverse to the conveying direction so that it can be adapted to the various possible package positions which can be produced by one or two adjustable guide rails during transport along the label dispenser or so that the position of the label on the package itself can be influenced.

The label dispenser may be adjustable in a vertical direction so that it can be adapted to different heights of the packages. The vertical adjustment can be implemented such that it is executable by hand or by means of a drive, which, in turn, is adjustable to the desired position by the control unit.

According to one embodiment of the present invention, at least two stoppers and a single conveyor belt are provided to successively release, by means of the stoppers, individual lanes of packages. One stopper for each lane may be provided. Alternatively, two successive conveyor belts may be, provided, and the stoppers may be disposed between the two conveyor belts. The stoppers may be a structurally simple, space- and cost-saving embodiment and may be arranged below the conveying plane according to one embodiment of the present invention.

The stoppers can be vertically movable by means of pneumatic cylinders, or other similar devices, that may be arranged above the conveyor belt and may be adapted to be controlled individually by the control unit.

According to one embodiment, the control unit may control the conveyor belt and the label dispenser. The dispensing rate of the label tape can be synchronized with the conveying speed of the conveyor belt to allow precise positioning of the label on the package.

According to one embodiment, the control unit may be part of a machine control unit of an upstream thermoform packaging machine making a separate control for the label dispenser unnecessary and improving the synchronization of the line converger together with the label dispenser, whereby an increase in performance may be accomplished.

The line converger may be configured for more than three lanes of packages.

A method, according to one embodiment of the present invention, for operating a line converger may include that the line converger receives a row of separate packages from a thermoform packaging machine and converges them into a lane of successive packages. The method may also include that a sensor is arranged in the area of the line converger and may detect the leading edge of a package moving past said sensor, and that a label dispenser may apply a label to the package while said package is still located fully or partly on the conveyor belt of the line converger. This method may also allow for a very compact structural design and a multi-functional operation of the line converger.

According to one embodiment, the stoppers can each stop a package of a lane while the conveyor belt is moving and release the side-by-side neighboring packages one after the other, so that the packages leave the line converger on a single lane with a distance between two successive packages.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Like reference numerals always designate like components in the drawings.

DETAILED DESCRIPTION OF THE INVENTION

Figure 1:
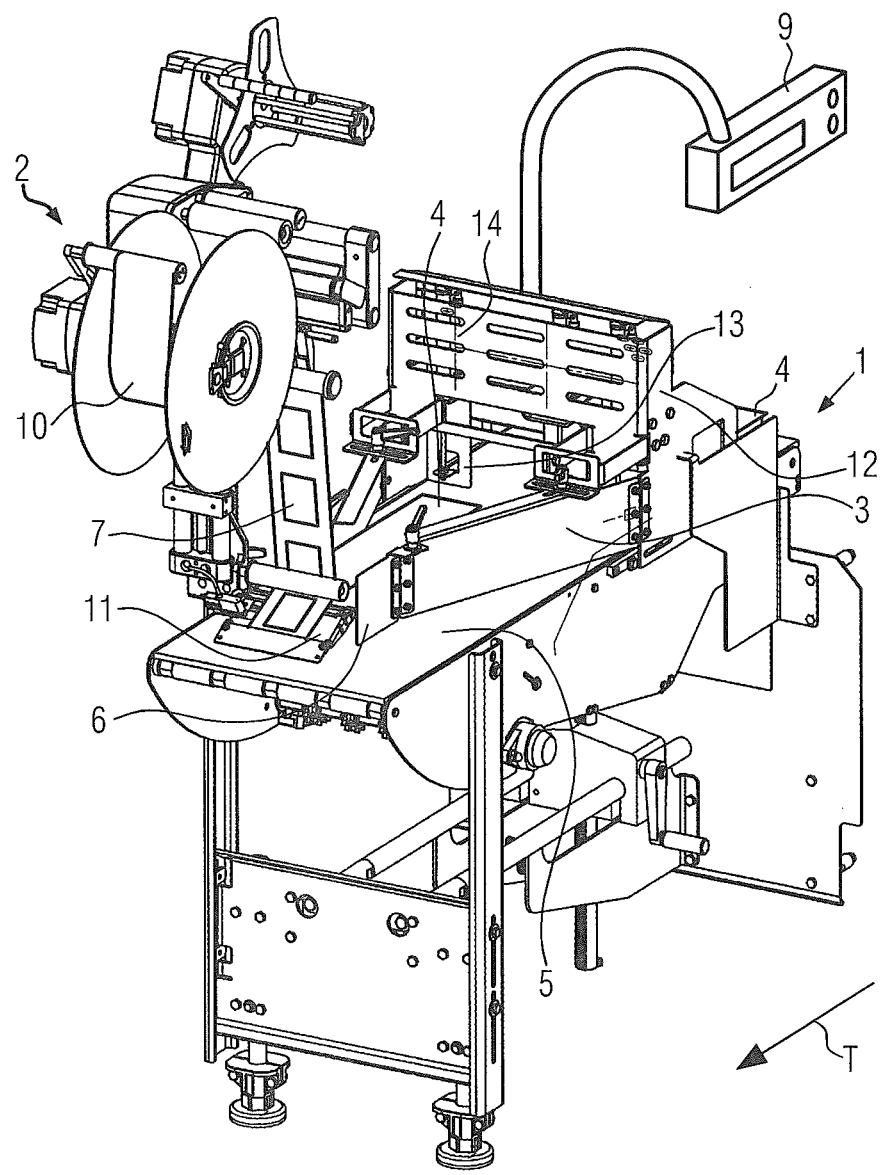
FIG. 1 is a perspective view of a line converger with a label dispenser according to one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a line converger 1 according to one embodiment of the present invention with a label dispenser 2 which may be arranged at the end of the line converger 1 when seen in a conveying direction T. The line converger 1 may also include two movable guide rails 3 that may be converging towards one another and that can be adjusted such that a gap or opening for packages 4 is defined at the downstream end of the guide rails 3. The width of the gap or opening may be only slightly larger than the width of the package 4. The gap can be formed at an arbitrary position transverse to the conveying direction T. In FIG. 1, the gap is shown in the central area transverse to the conveying direction above and on a conveyor belt 5. The guide rails 3 can be provided with additional guides 6 on a downstream end thereof to align the package 4 along the conveying direction T. A label 7 can then be positioned precisely on the package 4 based on its transverse position with respect to the conveying direction T.

Figure 2:
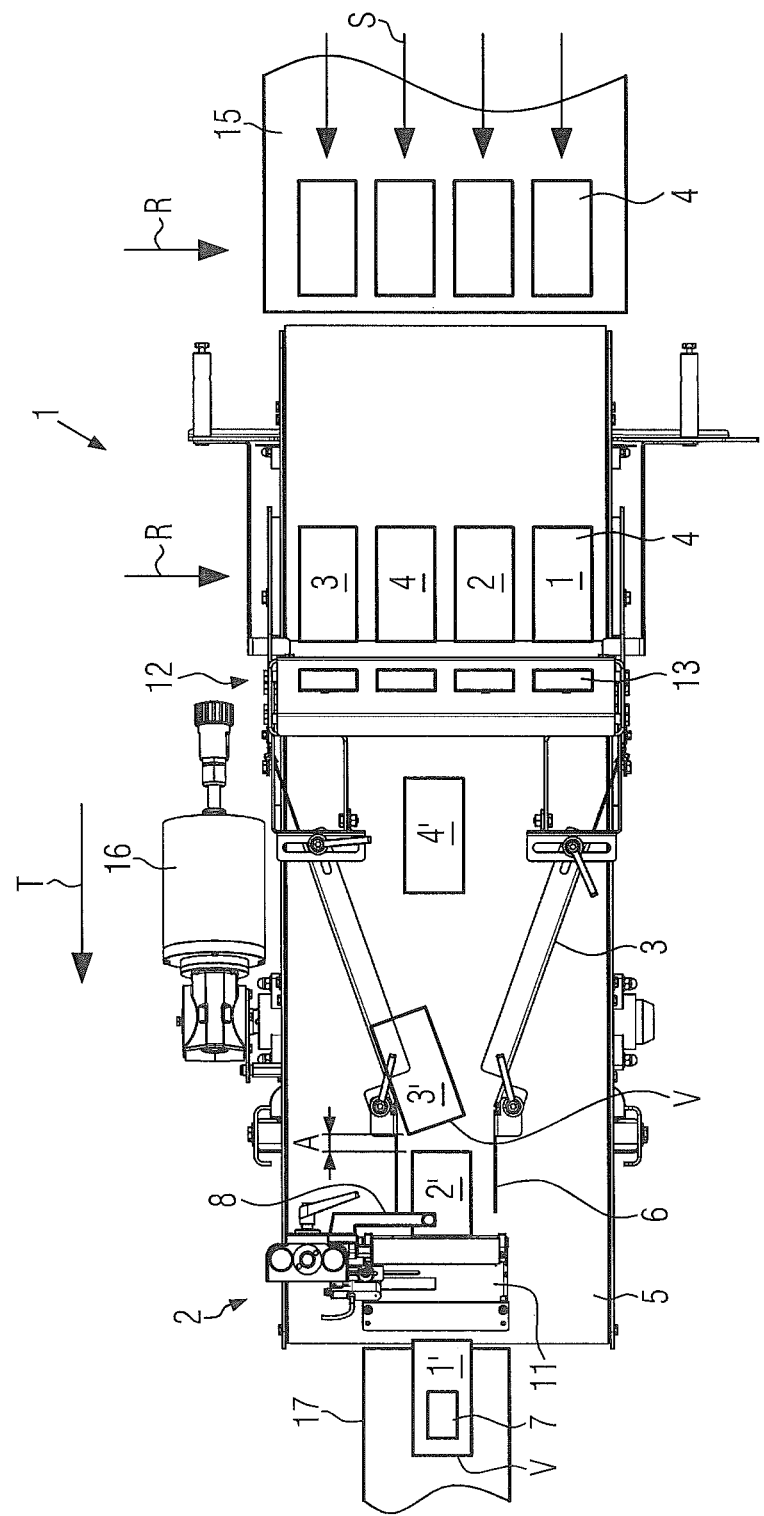
FIG. 2 is a plan view of the line converger in FIG. 1 according to one embodiment of the present invention.

A sensor 8 (as shown in FIG. 2), may be provided on the label dispenser 2. The sensor 8 can detect a leading edge V of a package 4 to be labeled while the package 4 is being conveyed along the guides 6. The sensor 8 may be configured as a light barrier or a proximity sensor and may be connected to a control unit 9, to which the sensor 8 may transmit a signal, such as the detection of the front edge V of the package 4. By means of the speed and the path of the label tape 10 towards and along a dispensing edge 11, the control unit 9 can control the movement of the label 7 to be dispensed so as to detach the label 7 from the label tape 10 and apply it to the package 4. The speed of the label tape 10 during the operation of dispensing a label onto the package 4 may be identical to the speed of the conveyor belt 5. Upstream, a stopping unit 12 can be arranged in front of the guide rails 3 so as to stop a row R of packages 4 while the conveyor belt 5 is moving. To this end, a stopper 13 may be provided for each package 4, and each stopper 13 may be vertically movable by means of a pneumatic cylinder 14 between a lower position for stopping the package 4 and an upper position for releasing the package 4. The pneumatic cylinders 14 and the stoppers 13 may be controlled by the control unit 9 separately and may be controlled with a time shift so as to release the packages 4 one after the other.

The sequence of converging operations to form a single lane of successive packages 4 and the sequence of label dispensing operations are explained in more detail with reference to FIG. 2. For the sake of clarity, only the dispensing edge 11 of the label dispenser 2 is shown in the plan view. The plan view of the line converger 1 shows how a row R of four packages 4 is transferred from a thermoform packaging machine 15. A row R of packages 4 may be defined by a plurality of packages 4 arranged side by side in a direction transverse to the conveying direction T. A lane S of packages 4 may be defined by one or a plurality of packages 4 arranged one after the other in the conveying direction T. The thermoform packaging machine 15 may supply four lanes S, which each may comprise one package 4, to the line converger 1. The conveyor belt 5 of the line converger 1 may be driven by a motor 16, and its speed may be adjusted via the control unit 9 or the motor 16 running at a constant speed. The conveyor belt 5 may be configured as a link conveyor or a belt conveyor, and rubber, silicone or polyurethane may be used as a coating. Each of the packages 4 may be stopped by a stopper 13. The stoppers 13 may be raised separately by the control unit 9 for releasing the package 4 and lowered by said control unit 9 for stopping the next following package 4.

While a row R of packages 4 numbered 1, 2, 3, 4 may be stopped by the stoppers 13, the packages 4 of a previously supplied row R numbered 1', 2', 3', 4' may have already arrived at the converging point, such as a point downstream of the stoppers 13. In one embodiment, the stopper 13 for package 4 with number 1' was raised first, followed by stopper 13 for package 4 with number 2', followed by stopper 13 for package 4 with number 3' and finally by stopper 13 for package 4 with number 4'. In the course of this process, a distance A between two successive packages 4 is produced by providing a corresponding distance in time between the moments at which these packages 4 are released by the stoppers 13. This distance A can be advantageous insofar as it allows the sensor 8 to detect the leading edge V of each package 4. In the embodiment shown in FIG. 2, the guide rails 3 are adjusted to converge towards one another such that the packages 4 of each of the four lanes S leave the line converger 1 in succession in a central area of the conveyor belt 5 and are transmitted to a conveyor belt that will carry them on or to a downstream production unit 17, such as a weighing unit. The leading edge V of each package 4 may be detected by the sensor 8 and the label 7 may be dispensed and applied according to the desired position on the package 4.

In the embodiment shown in the figures, the label 7 is applied to the package 4 while part of the package 4 is still guided by the guides 6 and still rests completely on the conveyor belt 5.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations, and other uses and applications of the present construction will, however, become apparent to those skilled in the art after considering the specification and the accompanying drawings. All such changes, modifications, variations and other uses and applications which do not depart from the spirit and the scope of the invention are deemed to be covered by the invention which is limited only by the claims which follow.

What is claimed is:

1. A line converger comprising:
a conveyor belt having a first end, a second end, a width, and a length defined by said first end and said second end, said conveyor belt disposed for movement to convey a plurality of packages along said length in a conveying direction, wherein said width allows for conveyance of two or more of a plurality of packages in a side-by-side arrangement in said conveying direction;
at least one guide rail having an upstream end and a downstream end, said at least one guide rail disposed above said conveyor belt between said first end and said second end of said conveyor belt;
wherein said at least one guide rail is disposed to reduce a conveying width of said conveyor belt between a first conveying width and a second conveying width, and wherein said first conveying width allows conveyance of two or more of a plurality of packages in a side-by-side arrangement, and said second conveying width only allows conveyance of a plurality of packages in a one-after-the-other arrangement;
wherein said upstream end of said at least one guide rail at least partially defines said first conveying width, and said downstream end of said at least one guide rail at least partially defines said second conveying width, and wherein said downstream end of said at least one guide rail is disposed for movement in at least a direction transverse to said conveying direction for reducing or increasing the second conveying width;
said at least one guide rail further comprising a guide member disposed at said downstream end to align a package at a location along said width of said conveyor belt;
at least two stoppers disposed above said conveyor belt between said first end and said second end and upstream of said at least one guide rail, each of said at least two stoppers being arranged laterally adjacent to each other in a direction transverse to the conveying direction, wherein each of said at least two stoppers are independently moveable for selectively stopping the conveyance of one or more of a plurality of packages conveyed on said conveyor belt while said conveyor belt is moving;
a control unit in electronic communication with said conveyor belt;
a label dispenser disposed above said conveyor belt proximate said second end of said conveyor belt and disposed downstream of said downstream end of said at least one guide rail, said label dispenser being disposed along said width of said conveyor belt to align with said downstream end of said at least one guide rail for applying a label to a package while the package is still fully or partly conveyed on the length of the conveyor belt; and
said label dispenser further including a sensor connected to the control unit for detecting a leading edge of a package upon which the label is to be applied.

2. The line converger according to claim 1, wherein a position of the label dispenser is adjustable relative to the conveyor belt in a direction transverse to the conveying direction.

3. The line converger according to claim 1, wherein a position of the label dispenser is adjustable relative to the conveyor belt in a vertical direction.

4. The line converger according to claim 1, wherein the at least two stoppers are each vertically movable by means of a respective pneumatic cylinder arranged above the conveyor belt, and wherein the pneumatic cylinders are controllable individually by the control unit.

5. The line converger according to claim 1, wherein the control unit controls the conveyor belt and the label dispenser.

6. The line converger according to claim 5, wherein the control unit is part of a machine control unit of a thermoform packaging machine arranged upstream of the line converger.

7. The line converger according to claim 1, wherein the width of the conveyor belt and the first conveying width provide for the conveyance of three or more packages in the side-by-side arrangement.

8. A method of operating a line converger that includes a conveying belt, a control unit, a label dispenser and a sensor, the method comprising the steps of:
positioning a downstream end of at least one guide rail disposed above the conveyor belt to at least partially define a second conveying width of the conveying belt, wherein the downstream end of said at least one guide rail is disposed for movement in a direction substantially transverse to the conveying direction for increasing or reducing the second conveying width, and wherein the second conveying width is less than a width of two packages in a side-to-side arrangement;
receiving a row of two or more separate packages arranged side-by-side from a thermoform packaging machine onto the conveying belt;
moving the conveyor belt to convey said row of two or more separate packages arranged side-by-side in a conveying direction;
stopping one or more of the two or more separate packages on the conveying belt by moving a stopper into a conveying path of the one or more of the two or more separate packages while the conveying belt is moving;
selectively releasing the one or more of the two or more separate packages by moving the stopper out of the conveying path of the one or more of the two or more separate packages after the stopping step;
converging the two or more separate packages from a side-to-side arrangement to a one-after the other into a one-after-the-other single lane of successive packages after the selectively releasing step by using the at least one guide rail disposed on the conveyor belt, wherein an upstream end of the at least one guide rail at least partially defines a first conveying width of the conveyor belt, the first conveying width is greater than a width of the two or more separate packages in the side-to-side arrangement;
detecting a leading edge of at least one of the two or more separate successive packages moving past the sensor after the converging step; and
reporting the detection of the leading edge of the at least one of the two or more separate successive packages to the control unit;

applying a label on the at least one of the successive packages while the at least one of the successive packages is still fully or partly being conveyed on the conveyor belt.

9. The method according to claim 8, wherein the selectively releasing the one or more of the two or more separate packages after the stopping step further includes sequentially releasing the one or more of the two or more separate packages so that the packages leave the line converger in the single lane after the converging step with a predetermined distance between the two or more separate successive packages.

10. The method according to claim 8 further comprising the step of:
guiding a package at least partially by a guide member disposed on the downstream end of the at least one guide rail during the applying the label step.

11. The line converger according to claim 1 further comprising two guide rails disposed on said conveyor belt, the two guide rails forming a V-shape having a wide end and a narrow end, said wide end of said V-shape upstream of said narrow end of said V-shape, the wide end defines the first conveying width and the narrow end defines the second conveying width.

12. The line converger according to claim 11 wherein the downstream ends of the two guide rails define a gap at said narrow end, wherein said gap has a width greater than a width of one package and less than a width of two packages.

13. The line converger according to claim 11 wherein the downstream ends of each of the two guide rails are disposed for movement in a direction substantially transverse to the conveying direction, and wherein the downstream ends can be arranged on said conveyor belt so that the narrow end of the V-shape may be positioned on said conveyor belt at a plurality of positions along the width of the conveyor belt.

14. The line converger according to claim 1, wherein the upstream end of the at least one guide rail is pivotally connected to the line converger.

15. The line converger according to claim 11, wherein each of the upstream ends of each of the two guide rails is pivotally connected to the line converger, and each of the downstream ends of the two guide rails is disposed for movement in a direction transverse to the conveying direction.

* * * * *